(12) United States Patent
Mehta et al.

(10) Patent No.: US 9,204,260 B2
(45) Date of Patent: Dec. 1, 2015

(54) METHOD AND APPARATUS FOR GENERATING POSITIONING ASSISTANCE DATA

(71) Applicant: QUALCOMM Incorporated, San Diego, CA (US)

(72) Inventors: Chandrakant Mehta, Santa Clara, CA (US); Saumitra Mohan Das, Santa Clara, CA (US); Abhinav Sharma, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 13/801,640

(22) Filed: Mar. 13, 2013

(65) Prior Publication Data

US 2014/0274110 A1 Sep. 18, 2014

(51) Int. Cl.
*G08G 1/123* (2006.01)
*H04W 4/04* (2009.01)

(52) U.S. Cl.
CPC ..................................... *H04W 4/043* (2013.01)

(58) Field of Classification Search
CPC .................................................... H04W 4/043
USPC ........................ 701/408, 101; 455/450, 456.1
See application file for complete search history.

(56) References Cited

U.S. PATENT DOCUMENTS

| 7,650,013 | B2 | 1/2010 | Dietsch et al. |
| 7,711,687 | B2 | 5/2010 | Rappaport et al. |
| 2009/0043504 | A1 | 2/2009 | Bandyopadhyay et al. |
| 2010/0299065 | A1 | 11/2010 | Mays |
| 2011/0246148 | A1* | 10/2011 | Gupta et al. ...................... 703/2 |

OTHER PUBLICATIONS

Jiangeng Du et al., "Construct Three-dimensional Route from Blueprint Image of Building", School of Computer and Info. Tech. , Beijing Jiaotong Univ., 2008.*
Peter et al., "Indoor Navigation and Modeling Using Photographed Evacuation Plans and MEMS IMU," A special joint symposium of ISPRS Technical Commission IV & AutoCarto in conjunction with ASPRS/CaGIS 2010 Fall Specialty Conference, Nov. 15-19, 2010 Orlando, Florida, pp. 1-7.

* cited by examiner

*Primary Examiner* — Thomas G Black
*Assistant Examiner* — Luke Huynh
(74) *Attorney, Agent, or Firm* — Hunter Clark PLLC

(57) ABSTRACT

Systems and methods are provided herein for assistance data generation based on raster images, such as raster images of floor plans. A method provided herein for generating positioning assistance data includes obtaining a first raster image including a floor plan of an area; obtaining geographic reference information corresponding to the area, the geographic reference information including a location of the area; extracting structural features of the area from the floor plan of the area via the first raster image; and generating assistance data for the area based on the extracted structural features and the geographic reference information.

54 Claims, 10 Drawing Sheets

METHOD AND APPARATUS FOR GENERATING POSITIONING ASSISTANCE DATA

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to obtain and utilized to locate the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others. To assist in determining the position of a communication device, a device may generate or otherwise use positioning assistance data. These data may include, but are not limited to, node connectivity maps or graphs, transceiver heatmaps, timing reference information, etc.

SUMMARY

Systems and methods for assistance data generation based on raster images (e.g., of floor plans) are described herein. An example of a method for generating positioning assistance data as described herein includes obtaining a first raster image including a floor plan of an area; obtaining geographic reference information corresponding to the area, the geographic reference information including a location of the area; extracting structural features of the area from the floor plan of the area via the first raster image; and generating assistance data for the area based on the extracted structural features and the geographic reference information.

An example of an apparatus for generating positioning assistance data as described herein includes a communications subsystem configured to obtain a first raster image including a floor plan of an area, to obtain geographic reference information corresponding to the area, the geographic reference information including a location of the area; a structural feature extraction module communicatively coupled to the communications subsystem and configured to extract structural features of the area from the floor plan of the area via the first raster image; and an assistance data generation module communicatively coupled to the communications subsystem and the structural feature extraction module and configured to generate assistance data for the area based on the extracted structural features and the geographic reference information.

Another example of an apparatus for generating positioning assistance data as described herein includes means for obtaining a first raster image including a floor plan of an area; means for obtaining geographic reference information corresponding to the area, the geographic reference information including a location of the area; means for extracting structural features of the area from the floor plan of the area via the first raster image; and means for generating assistance data for the area based on the extracted structural features and the geographic reference information.

An example of a computer program product as described herein resides on a processor-executable computer storage medium and includes processor-executable instructions configured to cause a processor to obtain a first raster image including a floor plan of an area; obtain geographic reference information corresponding to the area, the geographic reference information including a location of the area; extract structural features of the area from the floor plan of the area via the first raster image; and generate assistance data for the area based on the extracted structural features and the geographic reference information.

A further example of an apparatus for generating positioning assistance data as described herein includes a processor configured to obtain a first raster image including a floor plan of an area, obtain geographic reference information corresponding to the area, extract structural features of the area from the floor plan of the area via the first raster image, and generate assistance data for the area based on the extracted structural features and the geographic reference information. The apparatus also includes a memory coupled to the processor and configured for storing data.

Items and/or techniques described herein may provide one or more of the following capabilities, as well as other capabilities not mentioned. Positioning is efficiently performed as described herein for venues for which computer-aided drawing (CAD) schematics are unavailable, thereby increasing versatility. Mobile positioning can be initialized and managed for a given location with reduced manual intervention and increased ease of use. The accuracy of heatmap data and other positioning assistance data is increased by utilizing improved structural analysis techniques as described herein. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for generation of information such as positioning assistance data (also referred to herein as simply "assistance data" or AD) for an area based on rasterized structural representations of the area, such as an image of a floor plan. In general, indoor positioning systems are capable of generating assistance data for a location based on floor plan information for the location. Floor plan information is typically provided via computer-aided design (CAD) formatted files, such as Drawing Exchange Format (DXF) files, DWG files (e.g., utilized by the AutoCAD software platform developed and distributed by Autodesk, Inc.), or the like. However, venue owners may not have CAD format floor plans in some cases. Instead, the relevant floor plans may only be available as raster images (e.g., in Portable Network Graphics (PNG) files, Joint Photographic Experts Group (JPEG or JPG) files, or files of other formats).

To accommodate these raster image floor plans, positioning systems can be configured to accept a raster image input file that represents an image of the relevant floor plan and use the input image to extract a CAD format floor plan for further processing. However, this process involves several intermediate steps and manual intervention, which reduces the efficiency of the system. For instance, such a system may conduct a first conversion from a raster image to a CAD file, a second conversion from a CAD file to an Extensible Markup Language (XML) representation of the venue, and subsequent extraction of the assistance data from the XML data, and each of these steps may be configured to utilize user input or other manual operations for correct or optimal functionality.

Described herein are techniques for streamlining and improving processing associated with positioning systems such that assistance data is directly generated from a raster image with reduced manual intervention. In general, the described techniques employ various operations including obtaining a raster image, extracting (or otherwise preserving) structural information represented in the image, and assistance data generation. Each of these operations is described in further detail below.

Figure 1:
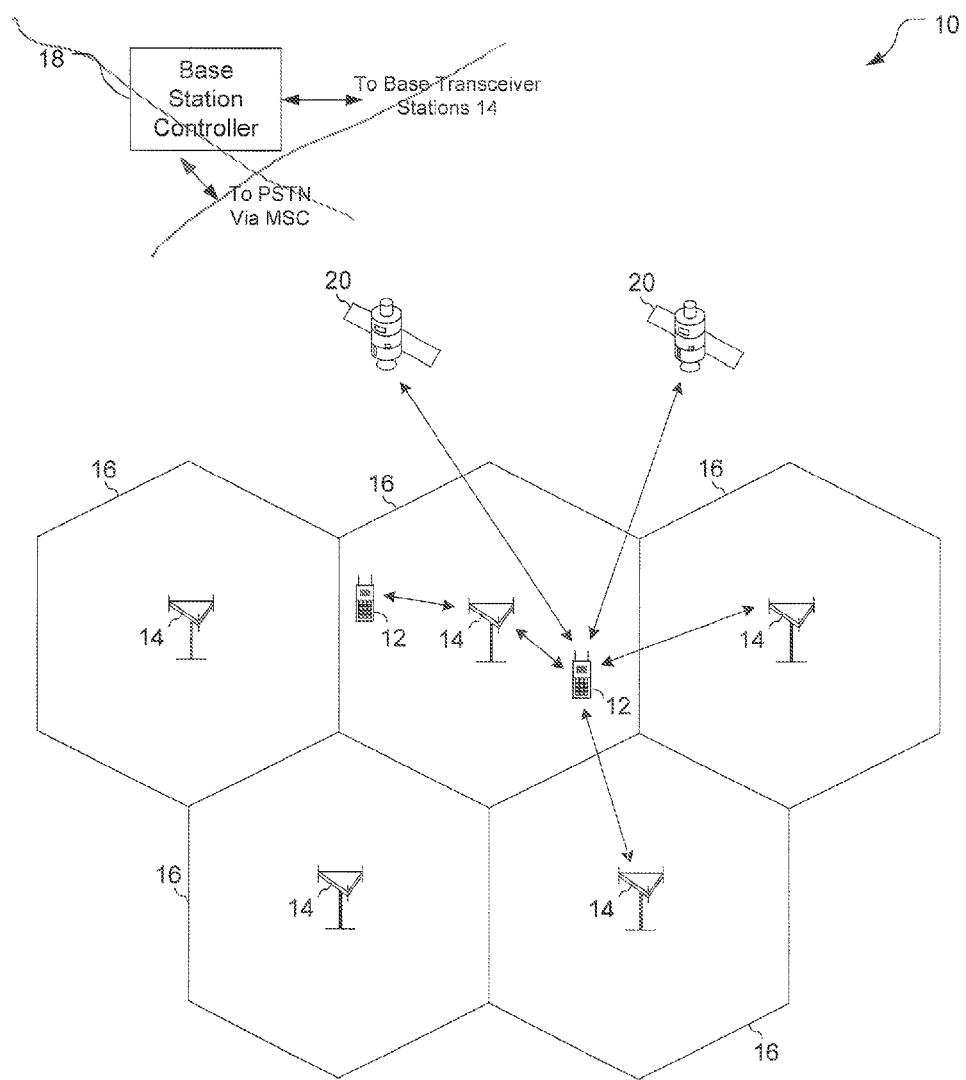
FIG. 1 is a schematic diagram of a wireless telecommunication system.

Systems and methods described herein operate via one or more mobile devices operating in a wireless communication system. Referring to FIG. 1, a wireless communication system 10 includes base transceiver stations (BTSs) 14 disposed in cells 16. The BTSs 14 provide communication service for a variety of wireless communication devices, referred to herein as mobile devices 12. Wireless communication devices served by a BTS 14 can include, but are not limited to, personal digital assistants (PDAs), smartphones, computing devices such as laptops, desktops or tablet computers, automobile computing systems, etc., whether presently existing or developed in the future.

The system 10 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTS 14 can wirelessly communicate with the mobile devices 12 in the system 10 via antennas. A BTS 14 may also be referred to as a base station, an access point, an access node (AN), a Node B, an evolved Node B (eNB), etc. The BTS 14 is configured to communicate with mobile devices 12 via multiple carriers. The BTS 14 can provide communication coverage for a respective geographic area, here the cell 16.

The cell 16 of the BTS 14 can be partitioned into multiple sectors as a function of the base station antennas.

The system 10 may include only macro base stations 14 or it can have base stations 14 of different types, e.g., macro, pico, and/or femto base stations, etc. A macro base station may cover a relatively large geographic area (e.g., several kilometers in radius) and may allow unrestricted access by terminals with service subscription. A pico base station may cover a relatively small geographic area (e.g., a pico cell) and may allow unrestricted access by terminals with service subscription. A femto or home base station may cover a relatively small geographic area (e.g., a femto cell) and may allow restricted access by terminals having association with the femto cell (e.g., terminals for users in a home).

The mobile devices 12 can be dispersed throughout the cell 16. The mobile devices 12 may be referred to as terminals, access terminals (ATs), mobile stations, user equipment (UE), subscriber units, etc. The mobile devices 12 can include various devices as listed above and/or any other devices.

As further shown in FIG. 1, a mobile device 12 receives navigation signals from a satellite positioning system (SPS), e.g., through SPS satellites 20. The SPS satellites 20 can be associated with a single multiple global navigation satellite system (GNSS) or multiple such systems. A GNSS associated with satellites 20 can include, but are not limited to, Global Positioning System (GPS), Galileo, Glonass, Beidou (Compass), etc. SPS satellites 20 are also referred to as satellites, space vehicles (SVs), etc.

A mobile device 12 within the communication system 10 can estimate its current position within the communication system 10 using various techniques, based on other communication entities within view and/or information available to the mobile device 12. For instance, a mobile device 12 can estimate its position using information obtained from BTSs 14 and/or SPS satellites 20, as well as additional information as described in further detail below.

Figure 2:
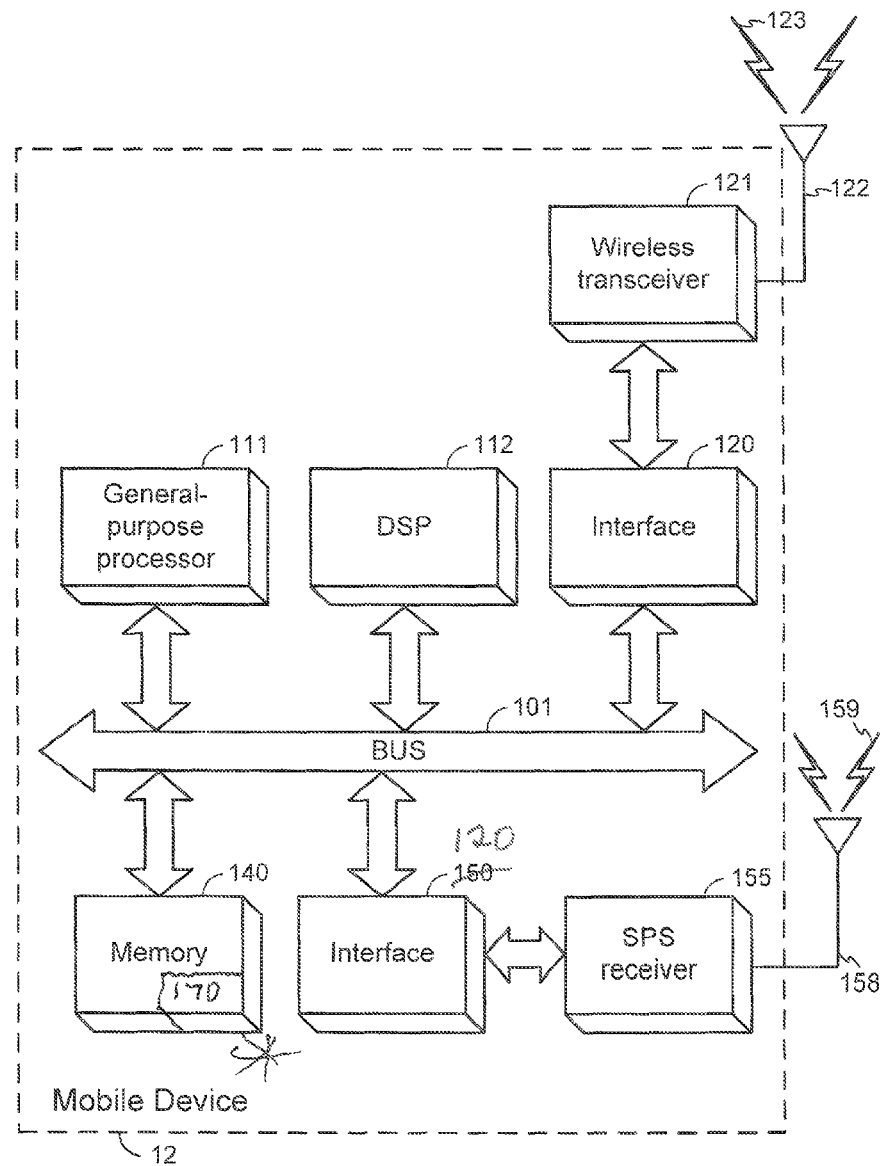
FIG. 2 is a block diagram of components of a mobile station shown in FIG. 1.

Referring next to FIG. 2, an example one of the mobile devices 12 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 2, the wireless transceiver bus interface 120 may also be a part of the wireless transceiver 121. Here, the mobile device 12 is illustrated as having a single wireless transceiver 121. However, a mobile device 12 can alternatively have multiple wireless transceivers 121 and wireless antennas 122 to support multiple communication standards such as WiFi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 2, more than one of any of these components could be used by the mobile device 12. The general purpose processor 111, DSP 112 and memory 140 are connected to the bus 101.

The mobile device 12 also includes an SPS receiver 155 that receives SPS signals 159 (e.g., from SPS satellites 20) via an SPS antenna 158. The SPS receiver 155 processes, in whole or in part, the SPS signals 159 and uses these SPS signals 159 to determine the location of the mobile device 12. The general-purpose processor 111, memory 140, DSP 112 and/or specialized processor(s) (not shown) may also be utilized to process the SPS signals 159, in whole or in part, and/or to calculate the location of the mobile device 12, in conjunction with SPS receiver 155. Storage of information from the SPS signals 159 or other location signals is performed using a memory 140 or registers (not shown).

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software 170 (programming code, instructions, etc.) configured to cause the processor 111 and/or DSP 112 to perform the functions described. Alternatively, one or more functions of the mobile device 12 may be performed in whole or in part in hardware.

Figure 3:
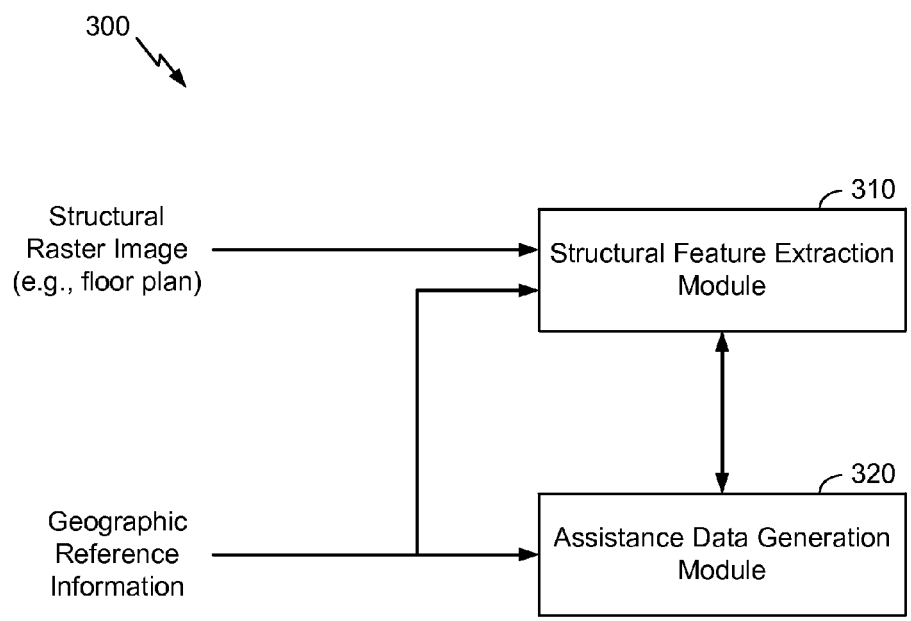
FIG. 3 is a block diagram of a system for generating positioning assistance data based on raster images.

Referring next to FIG. 3, a system 300 for generating positioning assistance data based on raster images includes a structural feature extraction module 310 and an assistance data generation module 320. The system 300 streamlines generation of assistance data from a raster image of a relevant floor plan by directly processing the raster image for assistance data generation. A structural raster image, e.g., an image depicting a floor plan of a location, is initially received at the structural feature extraction module 310, e.g., via a wireless transceiver. The structural feature extraction module 310 extracts the structural features (e.g., walls, doors, elevators, etc.) depicted in the floor plan and passes information relating to these features to the assistance data generation module 320. The information relating to the structural features may include a database or list of the structural features, an intermediate visual representation of the structural features (e.g., a reduced or processed image), and/or any other types of information suitable for conveying the structural features to the assistance data generation module 320.

The assistance data generation module 320 receives the structural features processed by the structural feature extraction module 310 as well as geographic reference information and/or wireless beacon transmitter information corresponding to the location depicted by or otherwise associated with the structural raster image. The geographic reference information may include, but is not limited to, the address and/or latitude/longitude coordinates of the location, a location name or classification (e.g., mall, office building, etc.), or the like. The wireless beacon transmitter information may include, but is not limited to, locations, identifiers (e.g., AP IDs, Medium Access Control (MAC) addresses, etc.) and/or other properties of APs and/or other transceivers within or near the location that transmit wireless beacon signals and/or other signals usable by mobile devices within or near the location. The wireless beacon transmitter information may be transmitted and/or retrieved in combination with the geographic reference information (e.g., as part of the geographic reference information). Alternatively, the wireless beacon transmitter information and geographic reference information may be transmitted and/or obtained separately.

Based on the structural raster image, the geographic reference information and the transceiver information, the system 300, via the modules 310, 320, generates corresponding positioning assistance data automatically and without user intervention. In some cases, the system 300 may also produce intermediate files or representations, such as XML files, CAD files or the like corresponding to the venue, in addition to generating the assistance data directly from the structural raster image. The assistance data generated for a given venue by the system 300 can include a connectivity map for the venue, a transceiver heatmap for the venue, and/or any other data usable by a positioning system for identifying position within the venue. The connectivity map provides information relating to paths through the venue as defined by rooms, nodes, or other means. The transceiver heatmap provides information relating to transceiver properties, such as signal strength and/or timing information, for respective positions within the venue. The assistance data generated by system 300, as well as techniques for distributing and using such data, are described in further detail below.

Figure 4:
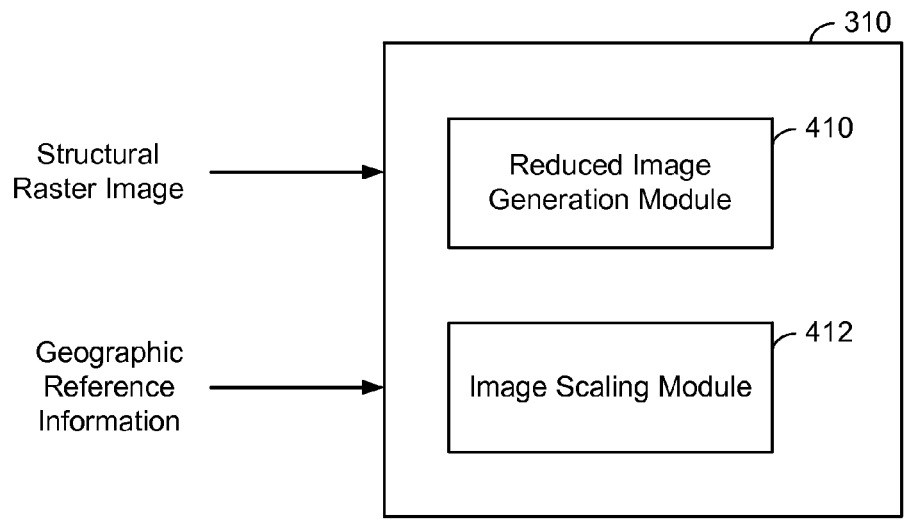
FIG. 4 is a functional block diagram of the structural feature extraction module shown in FIG. 3.

Operation of the structural feature extraction module 310 is shown in further detail by FIG. 4. As shown in FIG. 4, the structural feature extraction module 310 includes a reduced image generation module 410 and an image scaling module 412. The reduced image generation module 410 receives a first structural raster image as input and produces a second raster image that contains relevant structural features of the corresponding location, such as walls, doors, elevators or the like. Here, the reduced image generation module 410 is configured to remove non-structural features from the first raster image to generate the second raster image. For instance, non-structural information in the first image (e.g., room numbers, evacuation routes, etc.) may be omitted from the second image. In this sense, the second raster image is a "reduced" version of the original raster image. However, the operations performed by the reduced image generation module 410 need not be limited to removal of features, and the reduced image generation module 410 can additionally or alternatively add and/or change structural features from the first raster image to the second raster image based on received information or other factors. In general, the reduced image generation module 410 may be configured to perform any operations upon a structural raster image that are suitable for assisting in generation of assistance data corresponding to the image via the assistance data generation module 320. Upon generation, the second raster image produced by the reduced image generation module 410 may be stored (e.g., by a memory 140), transmitted to one or more devices, and/or used in any other suitable manner.

The reduced image generation module 410 generates an image corresponding to a given venue using bit crossing techniques (e.g., ray tracing) and/or any other techniques suitable for rendering an image for subsequent processing by a positioning system. In some cases, the reduced image generation module 410 and/or the system 300 in general utilizes colors present in a given structural raster image for various purposes. For instance, the system 300 can identify portions of a raster image in a first color and other portions in a second color, based on which the system 300 can conduct further processing of the portions in the first color and omit or bypass processing for the portions in the second color, or vice versa. Other implementations based on image color(s) are also possible.

The image scaling module 412 receives geographic reference information corresponding to a given area and structural raster images for the area, such as an original image or an image produced by the reduced image generation module 410, and scales the image(s) in accordance with the geographic reference information. Scaling can be performed by the image scaling module 412 based on one or more reference points given in the geographic reference information. For instance, given the locations of corners, landmarks, or other features of a venue, the image scaling module 412 scales corresponding structural raster images based on the corner locations. Matching may be based on other geographic reference information, such as a venue size or other information.

Figure 5:
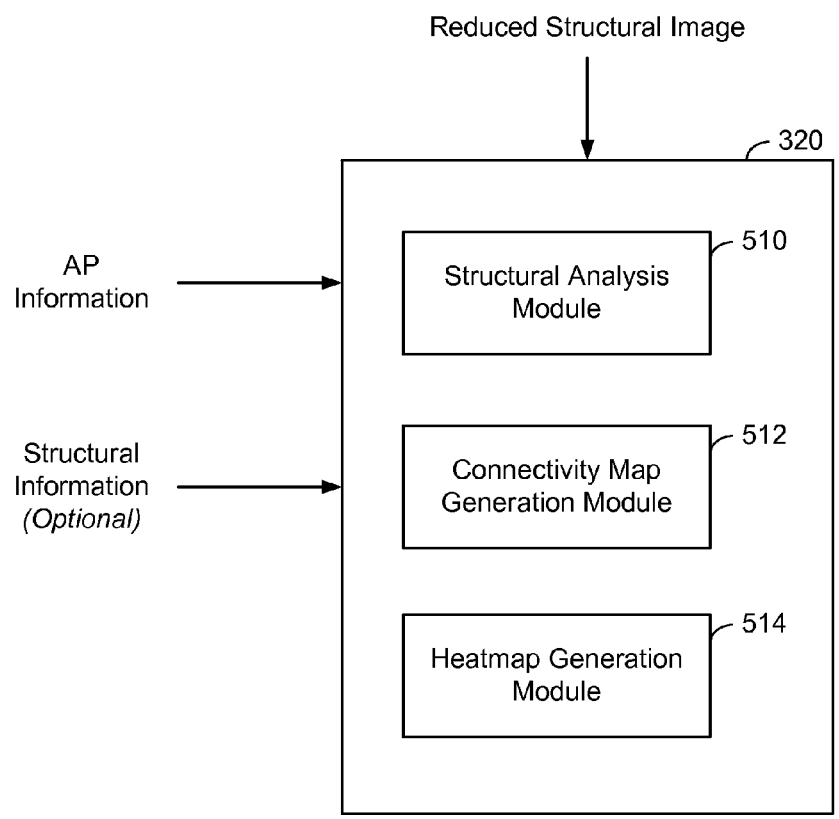
FIG. 5 is a functional block diagram of the assistance data generation module shown in FIG. 3.

Operation of the assistance data generation module 320 is shown in further detail by FIG. 5. As shown in FIG. 5, the assistance data generation module 320 includes a structural analysis module 510, a connectivity map generation module 512 and a heatmap generation module 514. The structural analysis module 510 receives a structural raster image, such as a reduced raster image produced by the reduced image generation module, in combination with AP information or other transceiver information. The structural analysis module 510 may also receive additional structural information, such as building materials associated with a venue, structural models or parameters, or other information. The structural analysis module 510 performs initial processing of the above received information and assists the connectivity map generation module 512, the heatmap generation module 514, and/or the assistance data generation module 320 generally in building assistance data for a venue.

The connectivity map generation module 512 identifies paths through a venue directly from structural raster images of the venue and constructs a connectivity map and/or other representation of these paths. The connectivity map can be expressed in terms of points or nodes defined throughout the venue and/or in other terms, e.g., based on identified rooms, hallways, etc., identified throughout the venue. The connectivity map generation module 512 builds the pathway information for a venue by locating walls, doors, and other structural features depicted by the structural raster images of the venue. These features are located automatically without user intervention, thereby increasing the efficiency of the associated positioning system. The connectivity map may be generated in the form of a visual map, which may be a raster image that is constructed similarly to the reduced raster images described above. Alternatively, the connectivity map may be a database, list, or other representation of the pathways through the venue. For instance, the connectivity map may include a listing of nodes in the venue accompanied by respective listings for each node of the other nodes in the venue to which direct travel is possible. In general, the connectivity map generation module 512 can construct the connectivity map in any manner suitable to identify connected and disconnected (e.g., separated by walls or other objects) points through the location and/or to identify pathways through the location.

The heatmap generation module 514 utilizes received transceiver information for a venue in combination with structural images of the venue to build one or more heatmaps indicative of estimated signal properties of wireless beacon transmitters or other transceivers placed throughout the venue. Here, "wireless beacon transmitter" refers to a device that transmits wireless beacon signals or other signals that may be utilized for positioning by devices within a communication range of the transmitter. A wireless beacon transmitter may also optionally provide communication service for one or more communications devices. A wireless beacon transmitter may be, or include the functionality of, a Bluetooth transceiver, a radio frequency identification (RFID) tag, a Wi-Fi AP or other AP, a femtocell or other cellular base station or access node, and/or any other suitable transceiver. The heatmap generation module 514 can create one or more heatmaps for different transceiver properties. Heatmaps that can be created include, but are not limited to, a round trip time (RTT) heatmap that provides expected signal propagation information from the APs or other transceivers in the venue given in terms of RTT, a signal strength heatmap that provides expected received signal strength indicator (RSSI) values from the APs or other transceivers in the venue, etc.

Heatmap parameters for a transceiver, such as signal quality or propagation delay, vary as a function from the transceiver. Further, these parameters may vary based on walls, partitions, or other attenuating structural features of the venue. Thus, the structural analysis module 510 is further configured to identify attenuating structural features depicted in the structural raster image(s) for a venue. The heatmap generation module then 514 utilizes the identified attenuating structural features to apply a determined amount of attenuation to the expected signal properties of each transceiver in the venue and to reflect these attenuations on the generated heatmap(s). For instance, lines in a structural raster image of a venue that depict walls are identified, and the thickness of these lines is determined Since the thickness of respective lines in a structural diagram generally corresponds to the thickness of the walls to which the lines correspond, the thickness of respective walls in the venue is estimated as a function of the determined thickness of the corresponding lines. Other factors, such as the scaling of the image as determined by the structural feature extraction module 310, may also be used in the wall thickness estimation. The heatmap generation module 514 utilizes the wall thicknesses once determined, in combination with one or more attenuation models associated with the corresponding walls and other attenuating structural features, to apply appropriate signal attenuations to the heatmap on a feature-by-feature basis. The attenuation models used by the heatmap generation module 514 may be generalized or location-specific models for a building or class of buildings, models for respective structural (building) materials or combinations of materials used in construction of a attenuating structural feature, and/or any other property that could affect the attenuation of a wireless signal. Multiple generalized models could also be used, e.g., a first model for exterior-facing walls or other attenuating structural features and a second model for interior attenuating structural features. Other models are possible.

Figure 6:
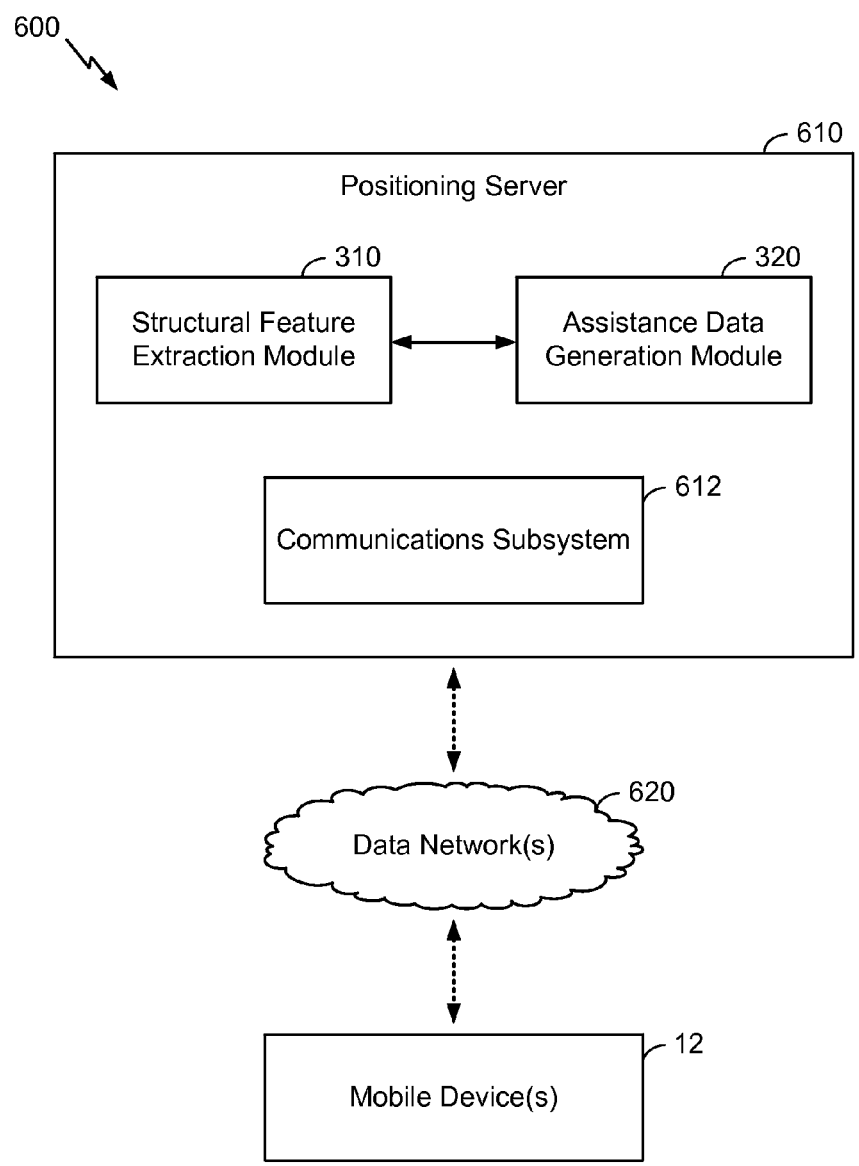
FIG. 6 is a block diagram of a system for providing positioning assistance data to one or more associated mobile devices.

Referring next to FIG. 6, a system 600 for providing positioning assistance data to one or more associated mobile devices 12 is illustrated. The system 600 includes a positioning server 610, which generates assistance data using the structural feature extraction module 310 and assistance data generation module 320 as described above. The positioning server 610 may be a local server that maintains data for only a single region or a small group of regions, or alternatively the positioning server 610 may maintain generalized information for many regions over a larger geographical area (e.g., a city, country, continent, etc.). While the positioning server 610 is shown in system 600 as an individual entity, the positioning server 610 may also be implemented at least in part by one or more access points, mobile devices 12, and/or other entities within the system 600.

The positioning server 610 is communicatively coupled to the mobile devices 12 via a communications subsystem 612. The communications subsystem includes transceivers, antennas, signal processing mechanisms, and/or any other components utilized for communication between the positioning server 610 and other devices in the system 600. Here, the positioning server 610 communicates to the mobile devices 12 through one or more data networks 620. The data networks 620 may include cellular communications networks operating according to any cellular radio access technology, other wireless communications protocols such as Bluetooth, Wi-Fi or the like, wired communication protocols, etc. The data networks 620 may also include one or more internetworks such as the Internet.

The positioning server 610 transmits generated assistance data to the mobile devices 12 for use by the mobile devices 12 in positioning. Here, the mobile device utilizes a positioning engine as generally known in the art to estimate a position within a venue or other location based on map data, obtained assistance data, and a series of network measurements (e.g., signal strength measurements, timing measurements, etc.). Measurements may be performed according to any suitable terrestrial or satellite positioning system or combination of systems. Assistance data may be transmitted to the mobile devices 12 periodically, e.g., according to regular system update intervals, or alternatively the positioning server 610 may maintain the assistance data and transmit specific data to a mobile device 12 upon request by the mobile device 12. While not shown in FIG. 6, both the positioning server 610 and the mobile devices 12 may include non-transitory computer storage media, e.g., a memory 140, for storing and maintaining assistance data and other data associated with a positioning engine.

Figure 7:
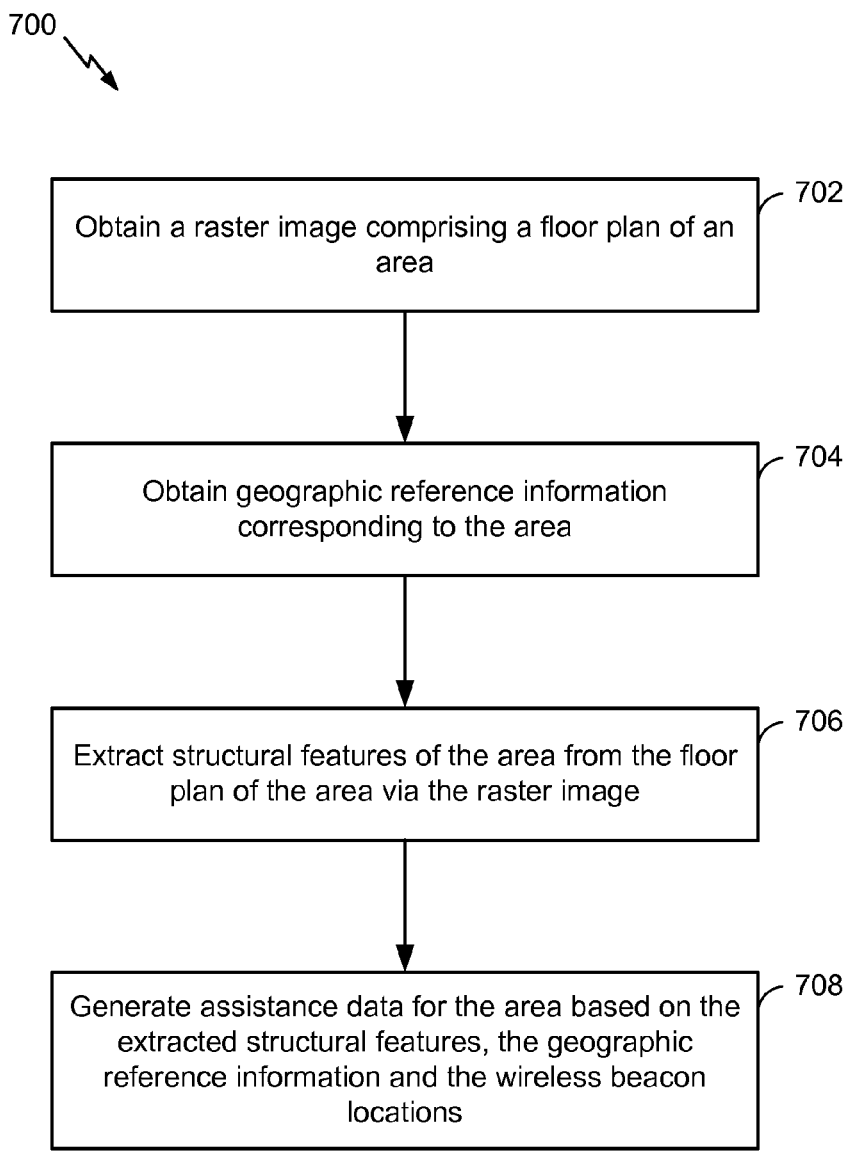
FIG. 7 is a block flow diagram of a process of generating positioning assistance data.

Referring to FIG. 7, with further reference to FIGS. 1-6, a process 700 of generating positioning assistance data includes the stages shown. The process 700 is, however, an example only and not limiting. The process 700 can be altered, e.g., by having stages added, removed, rearranged, combined, and/or performed concurrently. Still other alterations to the process 700 as shown and described are possible.

At stage 702, a raster image comprising a floor plan of an area is obtained. The image may be in any suitable raster image format, including PNG, JPG, bitmap (BMP), and/or any other format that conveys visual bit mapping information for respective pixel positions of an image. The image may include features of one color or multiple colors, which may be distinguished in further processing as described above.

At stage 704, geographic reference information corresponding to the area depicted by the floor plan is obtained. The geographic reference information may include, e.g., address and/or identity information for the area and/or any other information as described above. The geographic reference information obtained at stage 704 may also correspond to a coordinate system associated with the floor plan, such as a global coordinate system (e.g., based on latitude/longitude or other non-location-specific information) or a local coordinate system (e.g., based on dimensions of the location and/or the input image). Further, in some embodiments the geographic reference information may contain information relating to one or more wireless beacons transmitted within the area, such as the locations and/or signal properties of the transmitters of the wireless beacons. In other embodiments, wireless beacon information may be transmitted and/or retrieved separately from the geographic reference information. The information shown at stages 702, 704 can be obtained by one or more elements of system 300, i.e., the structural feature extraction module 310 and/or the assistance data generation module 320, as described above. These modules may be implemented in one or more positioning devices, such as a positioning server 610, a mobile device 12, and/or any other suitable devices.

At stage 706, structural features of the area are extracted (e.g., by a structural feature extraction module 310) from the floor plan via the raster image. Extraction of structural features is performed as generally described above in an automatic manner without user intervention.

At stage 708, assistance data for the area are generated (e.g., by an assistance data generation module 320) based on the structural features extracted at stage 706 and the geographic reference information obtained at stage 704. The assistance data generated at stage 708 may include, but is not limited to, connectivity maps relating to pathways through the area, heatmaps corresponding to wireless beacon transmitters in the area, and/or any other information that can be utilized for positioning within the area. Techniques for generating these data are described in further detail above and in FIGS. 8-9 that follow.

Figure 8:
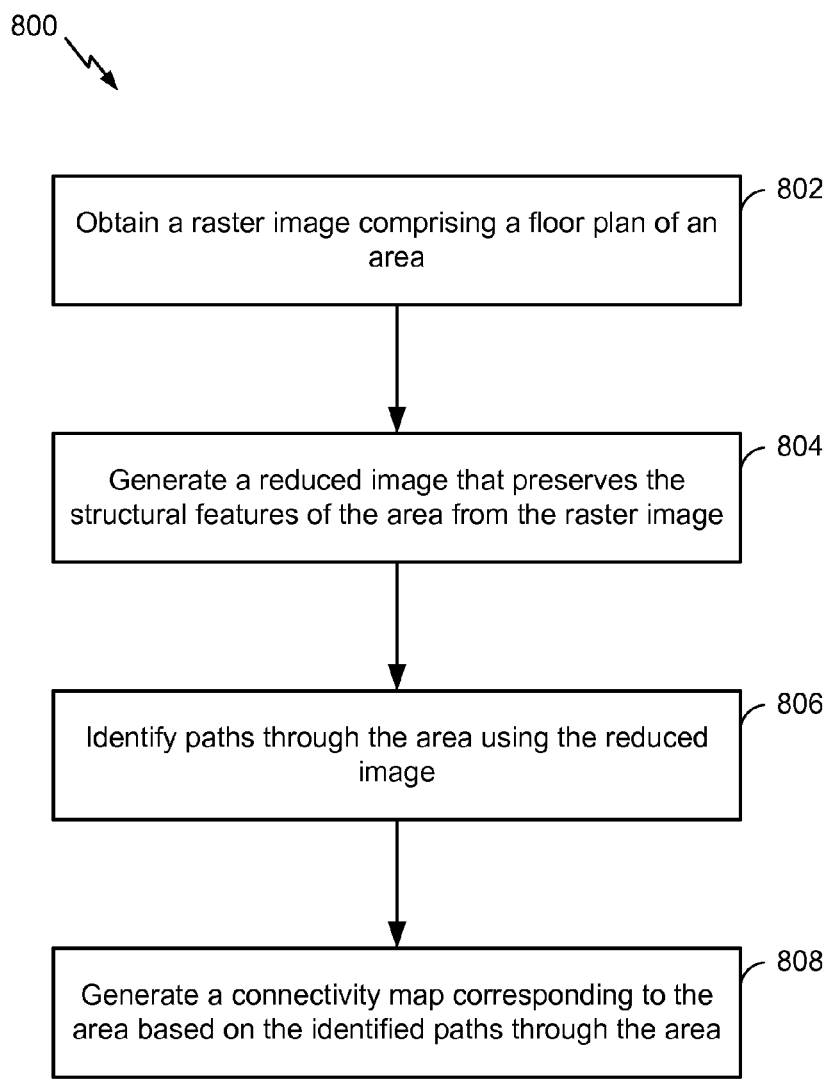
FIG. 8 is a block flow diagram of a process of generating a connectivity map of an area using a raster floor plan of the area.

Referring to FIG. 8, with further reference to FIGS. 1-6, a process 800 of generating a connectivity map of an area using a raster floor plan of the area includes the stages shown. The process 800 is, however, an example only and not limiting. The process 800 can be altered, e.g., by having stages added, removed, rearranged, combined, and/or performed concurrently. Still other alterations to the process 800 as shown and described are possible.

At stage 802, a raster image comprising a floor plan of an area is obtained. Operations performed at stage 802 are similar to operations described above with respect to stage 702.

At stage 804, a reduced image is generated, e.g., by a reduced image generation module 410 associated with a structural feature extraction module 310, that preserves the structural features of the area from the raster image obtained at stage 802. The reduced image is generated by removing, adding or changing elements of the received raster image as described above with respect to FIG. 4. Further, processing performed at stage 804 can be performed on an entire received image or portions of a received image, e.g., based on colors used in the image.

At stage 806, paths through the area are identified, e.g., by a structural analysis module 512 associated with an assistance data generation module 320, using the reduced image generated at stage 804. The paths through the area may be defined in terms of units such as rooms or hallways, respective anchor points or nodes in the area, and/or based on any other structure suitable for conveying information relating to pathways through the area depicted by the raster image received at stage 802.

At stage 808, a connectivity map corresponding to the area is generated, e.g., by a connectivity map generation module 512, based on the paths identified at stage 806. The connectivity map is generated as described above with respect to FIG. 5 and may take any form suitable for conveying path information for an area to a positioning device.

Figure 9:
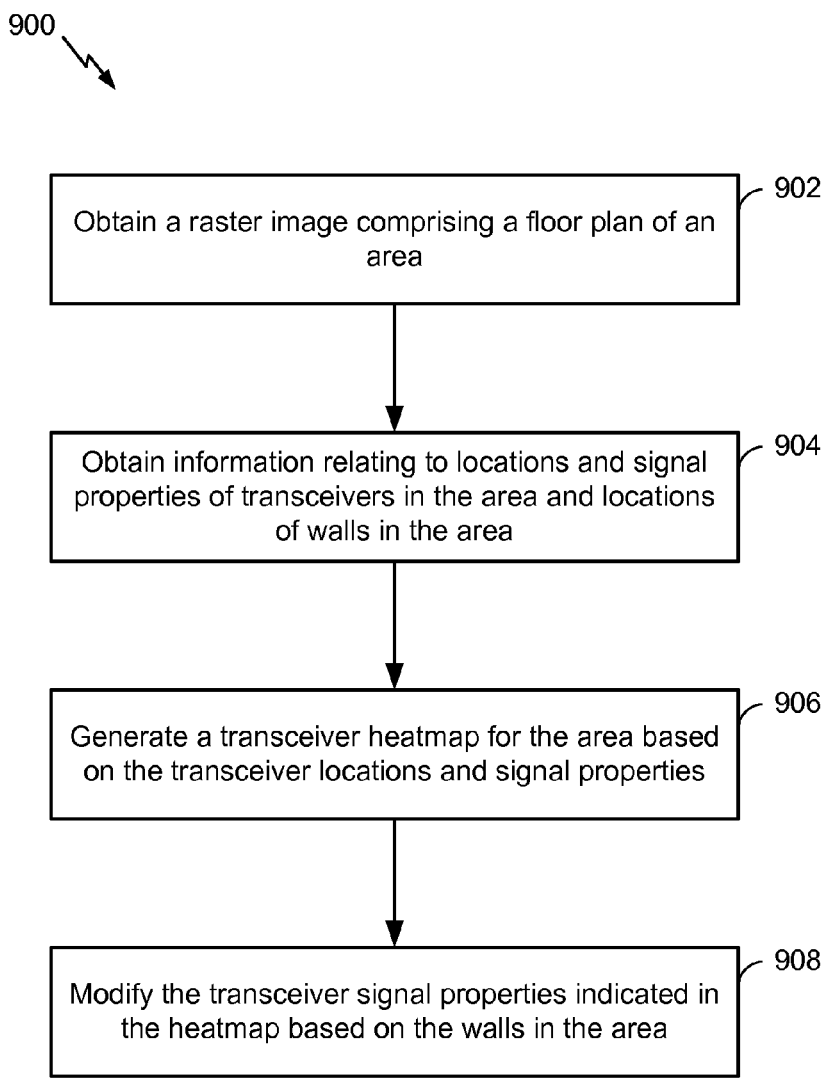
FIG. 9 is a block flow diagram of a process of generating a transceiver heatmap of an area using a raster floor plan of the area.

Referring to FIG. 9, with further reference to FIGS. 1-6, a process 900 of generating a transceiver heatmap of an area using a raster floor plan of the area includes the stages shown. The process 900 is, however, an example only and not limiting. The process 900 can be altered, e.g., by having stages added, removed, rearranged, combined, and/or performed concurrently. Still other alterations to the process 900 as shown and described are possible.

At stage 902, a raster image comprising a floor plan of an area is obtained. Operations performed at stage 902 are similar to operations described above with respect to stages 702 and 802.

At stage 904, information relating to locations and signal properties (e.g., signal strengths, signal propagation timing, etc.) of transceivers in the area, as well as locations of walls in the area, are obtained. The transceivers can include, but are not limited to, WLAN or other wireless APs, Bluetooth transceivers, radio frequency identifier (RFID) tags, and/or any other mechanisms operable as wireless beacon transmitters. The locations of walls in the area are obtained based on lines depicting the walls in the image obtained at stage 902, as generally described above.

At stage 906, a transceiver heatmap is generated (e.g., by a heatmap generation module 514) for the area based on the transceiver locations and signal properties received at stage 904. Construction of the heatmap at stage 906 is performed as described above with respect to FIG. 5.

At stage 908, the transceiver signal properties indicated in the heatmap generated at stage 906 are modified based on the walls in the area for which information is obtained at stage 904. Here, modification of the signal properties includes applying attenuation to signal strength indications associated with respective transceivers on a wall-by-wall basis for the area based on estimated widths of the walls, materials used in the walls or other models for the effect of the walls on wireless signals, and/or other factors as generally described above. While stages 906 and 908 are shown and described as separate stages, these stages may be performed together. For instance, the modifications described at stage 908 could be incorporated into the initial heatmap construction at stage 906. Other implementations are also possible.

Figure 10:
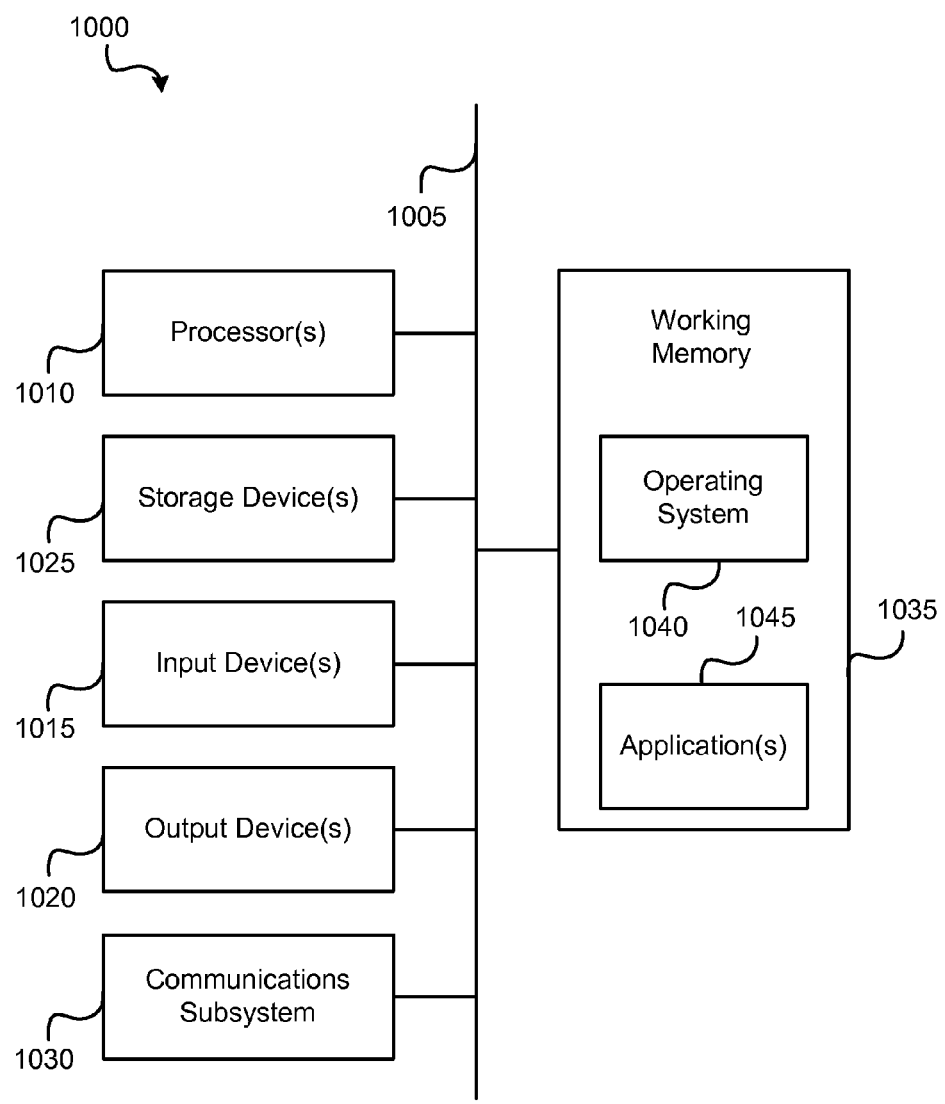
FIG. 10 is a block diagram of an example of a computer system.

A computer system 1000 as illustrated in FIG. 10 may be utilized to at least partially implement the functionality of the previously described computerized devices. In particular, the computer system 1000 can be utilized to implement, wholly or in part, mobile device 12 shown in FIG. 2, system 300 and its modules 310, 320 and respective sub-modules 410, 412, 510, 512, 514 shown in FIGS. 3-6, methods 700, 800, 900 respectively shown in FIGS. 7-9, and/or any and all other systems and methods described above. FIG. 10 provides a schematic illustration of one embodiment of a computer system 1000 that can perform the methods provided by various other embodiments, as described herein, and/or can function as a mobile device or other computer system. FIG. 10 provides a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like. The processor(s) 1010 can include, for example, intelligent hardware devices, e.g., a central processing unit (CPU) such as those made by Intel® Corporation or AMD®, a microcontroller, an ASIC, etc. Other processor types could also be utilized.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise, as here, a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1000) may be used to perform methods in accordance with the disclosure. Some or all of the procedures of such methods may be performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for generating positioning assistance data, the method comprising:
    obtaining a first raster image comprising a floor plan of an area;
    obtaining geographic reference information corresponding to the area, the geographic reference information comprising a location of the area;
    extracting structural features of the area from the floor plan of the area via the first raster image; and
    generating positioning assistance data for the area based on the extracted structural features and the geographic reference information.

2. The method of claim 1 wherein extracting the structural features of the area comprises generating a reduced raster image that includes the structural features of the area given by the first raster image.

3. The method of claim 2 wherein generating the assistance data comprises generating the assistance data based on the reduced raster image and the geographic reference information.

4. The method of claim 1 wherein generating the assistance data comprises generating a connectivity map indicative of paths through the area.

5. The method of claim 4 wherein generating the connectivity map comprises:
generating a reduced raster image that includes the structural features of the area given by the first raster image;
identifying paths through the area using the reduced raster image; and
building the connectivity map using the reduced raster image and the paths identified through the area.

6. The method of claim 1 further comprising identifying one or more wireless beacon transmitter locations within the area, wherein generating the assistance data comprises generating the assistance data based on the extracted structural features, the geographic reference information and the wireless beacon transmitter locations.

7. The method of claim 6 wherein generating the assistance data comprises:
obtaining information relating to signal properties of wireless beacons in the area respectively corresponding to the wireless beacon transmitter locations; and
generating a heatmap for the area based on the signal properties and the wireless beacon transmitter locations.

8. The method of claim 7 wherein:
obtaining the information relating to the signal properties comprises obtaining round trip time (RTT) information for the wireless beacons; and
generating the heatmap comprises generating an RTT heatmap corresponding to the area.

9. The method of claim 7 wherein:
obtaining the information relating to the signal properties comprises obtaining signal strength information for the wireless beacons; and
generating the heatmap comprises generating a signal strength heatmap corresponding to the area.

10. The method of claim 9 wherein the signal strength information comprises received signal strength indicator (RSSI) information for the wireless beacon transmitters in the area.

11. The method of claim 9 wherein generating the heatmap further comprises:
determining locations of attenuating structural features in the area from the extracted structural features; and
applying attenuation to signal strengths within the heatmap at the determined locations of the attenuating structural features.

12. The method of claim 11 wherein applying the attenuation comprises:
identifying one or more structural materials utilized in the area; and
applying the attenuation based on attenuation models associated with the one or more structural materials utilized in the area.

13. The method of claim 11 wherein the attenuating structural features comprise one or more walls, and applying the attenuation comprises:
estimating thickness of respective walls in the area based at least in part on widths of lines representing the walls in the floor plan; and
varying the attenuation applied in the heatmap for the respective walls as a function of the estimated thickness of the walls.

14. The method of claim 13 wherein estimating the thickness of the respective walls in the area comprises:
obtaining information relating to a drawing scale used for the first raster image;
determining widths of the respective walls in the first raster image; and
estimating the thickness of the respective walls by applying the drawing scale to the widths of the respective walls in the first raster image.

15. The method of claim 1 wherein extracting the structural features of the area comprises locating at least one of doors, walls or elevators within the floor plan of the area via the first raster image.

16. The method of claim 1 wherein extracting the structural features of the area comprises:
identifying a first portion of the first raster image rendered in a first color and a second portion of the first raster image rendered in a second color;
extracting the structural features of a first sub-area within the area corresponding to the first portion of the first raster image; and
bypassing extraction of structural features for a second sub-area within the area corresponding to the second portion of the first raster image.

17. The method of claim 1 further comprising transmitting the assistance data for the area to one or more mobile devices.

18. An apparatus for generating positioning assistance data, the apparatus comprising:
a communications subsystem configured to obtain a first raster image comprising a floor plan of an area and to obtain geographic reference information corresponding to the area, the geographic reference information comprising a location of the area;
a structural feature extraction module communicatively coupled to the communications subsystem and configured to extract structural features of the area from the floor plan of the area via the first raster image; and
an assistance data generation module communicatively coupled to the communications subsystem and the structural feature extraction module and configured to generate positioning assistance data for the area based on the extracted structural features and the geographic reference information.

19. The apparatus of claim 18 wherein the structural feature extraction module comprises a reduced image generation module configured to generate a reduced raster image that includes the structural features of the area given by the first raster image.

20. The apparatus of claim 19 wherein the assistance data generation module is further configured to generate the assistance data based on the reduced raster image and the geographic reference information.

21. The apparatus of claim 19 wherein the assistance data generation module comprises:
a structural analysis module configured to identify paths through the area using the reduced raster image; and
a connectivity map generation module configured to build the connectivity map using the reduced raster image and the paths identified through the area.

22. The apparatus of claim 18 wherein:
the communications subsystem is further configured to identify locations of one or more wireless beacon transmitters in the area; and
the assistance data generation module is further configured to generate assistance data for the area based on the extracted structural features, the geographic reference information and the locations of the one or more wireless beacon transmitters.

23. The apparatus of claim 22 wherein:
the communications subsystem is further configured to obtain information relating to signal properties of wireless beacons transmitted from the wireless beacon transmitters in the area; and the assistance data generation module comprises a heatmap generation module configured to generate a heatmap for the area based on the signal properties of the wireless beacons and the locations of the wireless beacon transmitters in the area.

24. The apparatus of claim 23 wherein the signal properties of the wireless beacons comprise round trip time (RTT) and the heatmap generation module is further configured to generate an RTT heatmap corresponding to the area.

25. The apparatus of claim 23 wherein the signal properties of the wireless beacons comprise signal strength and the heatmap generation module is further configured to generate a signal strength heatmap corresponding to the area.

26. The apparatus of claim 25 wherein the heatmap generation module is further configured to determine locations of attenuating structural features in the area from the extracted structural features and to applying attenuation to signal strengths within the heatmap at the determined locations of the attenuating structural features.

27. The apparatus of claim 26 wherein the attenuating structural features comprise one or more walls and the heatmap generation module is further configured to estimate thicknesses for respective walls in the area based at least in part on widths of lines respectively representing the walls in the floor plan and to determine an amount of attenuation applied to the heatmap for the respective walls as a function of the estimated thickness of the walls.

28. The apparatus of claim 27 wherein:
the communications subsystem is further configured to obtain information relating to a drawing scale used for the first raster image; and
the heatmap generation module is further configured to determine widths of the respective walls in the first raster image and to estimate the thicknesses for the respective walls in the area by applying the drawing scale to the widths of the respective walls in the first raster image.

29. The apparatus of claim 18 wherein the structural feature extraction module is further configured to locate at least one of doors, walls or elevators within the floor plan of the area via the first raster image.

30. The apparatus of claim 18 wherein the communications subsystem is further configured to transmit the assistance data for the area to one or more mobile devices.

31. An apparatus for generating positioning assistance data, the apparatus comprising:
means for obtaining a first raster image comprising a floor plan of an area;
means for obtaining geographic reference information corresponding to the area, the geographic reference information comprising a location of the area;
means for extracting structural features of the area from the floor plan of the area via the first raster image; and
means for generating positioning assistance data for the area based on the extracted structural features and the geographic reference information.

32. The apparatus of claim 31 wherein:
the means for extracting comprises means for rendering a reduced raster image that includes the structural features of the area given by the first raster image; and
the means for generating the assistance data comprises means for generating the assistance data based on the reduced raster image and the geographic reference information.

33. The apparatus of claim 31 wherein the means for generating the assistance data comprises means for generating a connectivity map indicative of paths through the area.

34. The apparatus of claim 33 wherein:
the means for extracting comprises means for rendering a reduced raster image that includes the structural features of the area given by the first raster image; and
the means for generating the connectivity map comprises means for identifying paths through the area using the reduced raster image and means for building the connectivity map using the reduced raster image and the paths identified through the area.

35. The apparatus of claim 31 further comprising means for identifying locations of one or more wireless beacon transmitters in the area, wherein the means for generating the assistance data comprises means for generating the assistance data for the area based on the extracted structural features, the geographic reference information, and the locations of the one or more wireless beacon transmitters.

36. The apparatus of claim 35 further comprising means for obtaining information relating to signal properties of wireless beacons transmitted from the wireless beacon transmitters in the area, wherein the means for generating the assistance data comprises means for generating a heatmap for the area based on the signal properties of the wireless beacons and the locations of the wireless beacon transmitters in the area.

37. The apparatus of claim 36 wherein the means for generating the heatmap comprises means for generating at least one of a round trip time (RTT) heatmap or a signal strength heatmap corresponding to the area.

38. The apparatus of claim 36 wherein the means for generating the heatmap further comprises:
means for determining locations of attenuating structural features in the area from the extracted structural features; and
means for modifying the signal properties of the wireless beacons indicated on the heatmap at the determined locations of the attenuating structural features.

39. The apparatus of claim 38 wherein the attenuating structural features comprise one or more walls and the means for generating the heatmap further comprises:
means for estimating thickness of respective walls in the area based at least in part on widths of lines representing the walls in the floor plan; and
means for varying an extent of modification of the signal properties of the wireless beacons indicated in the heatmap for the respective walls as a function of the estimated thickness of the walls.

40. The apparatus of claim 31 wherein the structural features comprise at least one of doors, walls or elevators.

41. The apparatus of claim 31 further comprising means for transmitting the assistance data for the area to one or more mobile devices.

42. A computer program product residing on a non-transitory processor-executable computer storage medium, the computer program product comprising processor-executable instructions configured to cause a processor to:
obtain a first raster image comprising a floor plan of an area;
obtain geographic reference information corresponding to the area, the geographic reference information comprising a location of the area;
extract structural features of the area from the floor plan of the area via the first raster image; and
generate positioning assistance data for the area based on the extracted structural features and the geographic reference information.

43. The computer program product of claim 42 further comprising instructions configured to cause the processor to:

render a reduced raster image that includes the structural features of the area given by the first raster image; and
generate the assistance data based on the reduced raster image and the geographic reference information.

44. The computer program product of claim 42 further comprising instructions configured to cause the processor to generate a connectivity map indicative of paths through the area based at least in part on the first raster image.

45. The computer program product of claim 42 further comprising instructions configured to cause the processor to:
   identify locations of one or more wireless beacon transmitters within the area; and
   generate the assistance data for the area based on the extracted structural features, the geographic reference information and the locations of the one or more wireless beacon transmitters.

46. The computer program product of claim 45 further comprising instructions configured to cause the processor to:
   obtain information relating to signal properties of wireless beacons transmitted from the wireless beacon transmitters in the area; and
   generate a heatmap for the area based on the signal properties of the wireless beacons and the locations of the wireless beacon transmitters in the area.

47. The computer program product of claim 46 further comprising instructions configured to cause the processor to generate the heatmap as at least one of a round trip time (RTT) heatmap or a signal strength heatmap corresponding to the area.

48. The computer program product of claim 47 further comprising instructions configured to cause the processor to:
   determine locations of attenuating structural features in the area from the extracted structural features, the attenuating structural features comprising one or more walls;
   estimate thickness of respective walls in the area based at least in part on widths of lines representing the walls in the floor plan; and
   modify the signal properties of the wireless beacons indicated on the heatmap at the determined locations of the attenuating structural features based, at least in part, on the estimated thickness of the walls.

49. The computer program product of claim 42 further comprising instructions configured to cause the processor to transmit the assistance data for the area to one or more mobile devices.

50. An apparatus for generating positioning assistance data, the apparatus comprising:
   a processor configured to obtain a first raster image comprising a floor plan of an area, obtain geographic reference information corresponding to the area, extract structural features of the area from the floor plan of the area via the first raster image and generate positioning assistance data for the area based on the extracted structural features and the geographic reference information; and
   a memory coupled to the processor and configured for storing data.

51. The apparatus of claim 50 wherein the processor is further configured to generate a connectivity map indicative of paths through the area.

52. The apparatus of claim 50 wherein the processor is further configured to identify transmitter locations and signal properties corresponding to one or more wireless beacons in the area and generate a heatmap for the area based on the transmitter locations and signal properties.

53. The apparatus of claim 52 wherein the processor is further configured to determine locations of attenuating structural features in the area from the extracted structural features and apply attenuation to signal strengths within the heatmap at the determined locations of the attenuating structural features.

54. The apparatus of claim 53 wherein:
   the attenuating structural features comprise one or more walls; and
   the processor is further configured to estimate thickness of respective walls in the area based at least in part on widths of lines representing the walls in the floor plan and vary the attenuation applied in the heatmap for the respective walls as a function of the estimated thickness of the walls.

* * * * *